July 28, 1936.  P. J. BERGGREN  2,049,042

FRAMING MECHANISM FOR MOTION PICTURE MACHINES

Original Filed Dec. 20, 1923

Per Johan Berggren.
INVENTOR.

BY Darby ~ Darby
ATTORNEYS.

Patented July 28, 1936

2,049,042

UNITED STATES PATENT OFFICE 2,049,042

FRAMING MECHANISM FOR MOTION PICTURE MACHINES

Per Johan Berggren, New York, N. Y.

Original application December 20, 1928, Serial No. 327,200. Divided and this application May 5, 1933, Serial No. 669,521. Renewed January 3, 1936

5 Claims. (Cl. 88—17)

This invention relates to motion picture apparatus and with particularity to improved framing mechanism for projecting machines.

An object of the invention is to provide a mechanism whereby the frames of an intermittently moving motion picture film may be adjusted into proper registry with a projection aperture.

A feature of the invention relates to the manner of mounting the usual intermittent feed sprocket on a vertically adjustable frame.

Other features and advantages relate to the organization, arrangement and relative location of parts which go to make up an efficient and easily attachable framing mechanism for motion picture projectors.

Other features and advantages of the invention not specifically enumerated will be apparent after a consideration of the following detail descriptions and the appended claims.

Referring to the drawing.

While the framing mechanism according to the present invention is capable of application generally to known types of motion picture projectors, it is of outstanding advantage when applied to a projector of the type disclosed in application Serial No. 327,200 to which reference may be had for a detail description of the parts of the projector not disclosed in the present application. Since the present application relates solely to the framing mechanism, only that portion of the projector is shown to enable a clear understanding to be attained of the method of adjusting the frame device.

Figure 2:
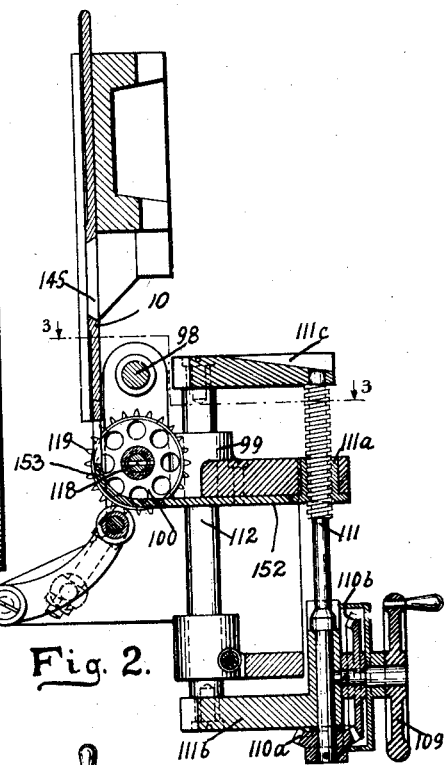
Fig. 2 is a vertical sectional view taken along the line 2—2 of Fig. 1.
Figure 3:
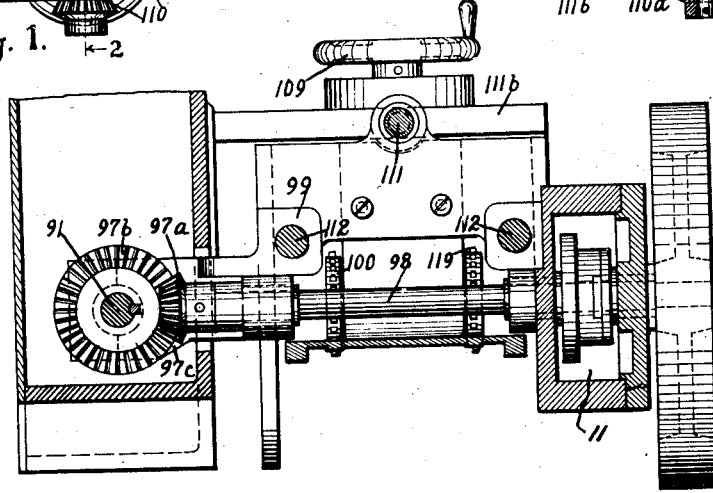
Figure 3 is a broken sectional view taken along the line 3—3 of Fig. 2.

Accordingly the upper part of Fig. 2 shows the back plate of film gate 10 having a projection aperture 145 therein and past which the motion picture film is adapted to be moved in an intermittent manner as described in detail in said application Serial No. 327,200. The motion picture film after passing the aperture 145 engages the teeth 119 of the sprocket device 100. Device 100 is mounted for rotation with the shaft 118 which is rotated in an intermittent manner by a Geneva movement as described in detail in the application referred to above. The shaft 118 and the associated star wheel of the Geneva movement is mounted in a frame 99 which also carries a horizontal shaft 98 provided with suitable journal bearings in the said frame. Shaft 98 is coupled through suitable intermediate gears to the continuously revolving finger of the Geneva movement shown generally at 11 in Fig. 3. Shaft 98 extends through a wall of the housing and carries at its left hand end a bevel gear 97a which cooperates with a corresponding bevel gear 97b splined for vertical movement on the main vertical driving shaft 91. Gear 97b rests on the extension 97c of the frame 99. Consequently as frame 99 is moved vertically both gears 97a and 97b are likewise moved vertically and thus maintained in proper driving relation. The gear 97b is capable of vertical sliding movement on shaft 91 at the same time that it is being rotated thereby. For a detail description of the manner of driving the shafts 91 and 98 reference may be had to said application Serial No. 327,200.

The frame 99 carrying the intermediate feed sprocket device 100 is adapted to be adjusted in a vertical direction on the standard 112 fastened in a bracket attached to the main housing of the projector head. For this purpose the frame 99 is provided with a threaded portion 111a through which passes the corresponding threaded end of a rod 111. Rod 111 is mounted for suitable rotation in the fixed brackets 111b and 111c and carries at its lower end a bevel gear 110a which cooperates with another bevel gear 110b. Bevel gear 110b is provided with an adjusting hand wheel 109. Consequently as the wheel 109 is turned the rod 111 translates the rotary movement of the hand wheel into a vertical movement of the frame 99 and the intermittent sprocket device 100. Since the gears 97b and 97a are likewise moved vertically this adjustment does not interfere with the intermittent rotation of the sprocket 100. Consequently the picture frames may be accurately brought into register with the projection apertures 145 without interfering with the intermittent motion of the film.

Figure 1:
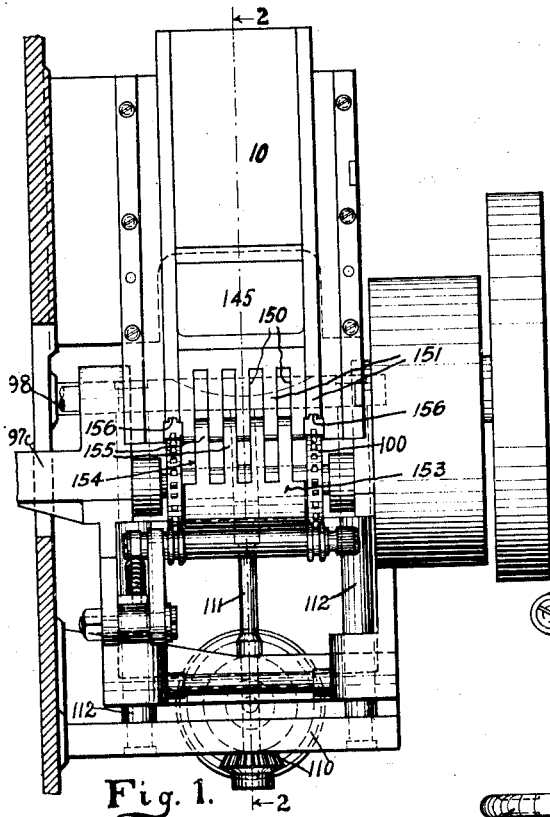
Fig. 1 is a partial view of a motion picture projector illustrating the particularly adjustable framing mechanism of the invention.

Secured to frame 99, as shown in Fig. 2, is a plate 152, which is curved upwardly around the front of the sprocket 100 into a portion 153, which is provided at its end with a plurality of grooves 154 forming spaced fingers 155. The lower end of the back plate 10 of the film gate is likewise provided with slots 150 forming spaced fingers 151. As will be seen from Fig. 1, the slots and fingers of these two plates are relatively placed so that the fingers of each member slidably engage in the slots of the other member.

The purpose of this structure as clearly set forth in said application Serial No. 327,200, is to provide a continuous guide surface for the film without interfering with the vertical adjustment of the carriage 99 and the parts attached thereto. For all positions of the carriage and the parts attached thereto the fingers of these members intermesh or are interleaved, or telescoped, so as to provide a continuous guiding surface along which the film may move.

As is apparent from the figures, and particularly Fig. 2, the back plate 10 and the portion 153 of the guide plate 152, including the cooperating fingers lie in the same plane, so as to provide a continuous smooth guide surface for the film. The purpose of this structure is to prevent any movement of the film in a direction transverse to its length under the forces which act on the film when it is brought to a stop. Obviously, any such transverse movement will have components in the direction of the length of the film, causing it to vibrate at the aperture, with a resultant flicker of the projected picture, which of course is highly undesirable.

The lower ends of the back plate 10 of the film guide are also slotted at 156 in alignment with the teeth of the sprocket 100, so as to accommodate the sprocket teeth when the sprocket wheel is adjusted towards this plate.

This application is a division of application Serial No. 327,200, filed December 20, 1928.

What is claimed is:

1. In a motion picture apparatus including intermittently acting film feeding mechanism and means to vertically adjust the same in combination with a gate structure having an aperture with reference to which the film is framed by the adjustment of said feeding mechanism, said gate having means to support the film above and below the aperture including telescoping slots and fingers formed respectively in the gate and in the film feeding adjusting mechanism.

2. In a motion picture apparatus including intermittently acting film feeding mechanism and means to vertically adjust the same in combination with a gate structure having an aperture with reference to which the film is framed by the adjustment of said feeding mechanism, said gate having means to support the film above and below the aperture, the lower portion of said gate having vertical slots, and interleaving fingers carried by the film feeding adjusting devices to afford a bearing support for the film below the aperture.

3. In a motion picture apparatus as described the combination comprising a film gate having an aperture therein, an intermittently actuated film feeding mechanism including a sprocket, a carriage in which said mechanism is journaled, means for adjusting the carriage in a plane parallel to said gate, and a guide member extending between the sprocket wheel and said gate, said gate and guide member having slots defining fingers which intermesh, and which lie in the same plane.

4. In a motion picture apparatus as described the combination including a film gate plate having an aperture therein, an intermittently actuated feed sprocket, a carriage for supporting the sprocket below said plate, a support for said carriage, means including an adjusting screw for moving said carriage in a plane parallel to said plate, and a guide member extending between the lower end of said plate and said sprocket wheel, said plate and guide member having transversely displaced slots forming on each fingers which telescope with the slots of the other.

5. In a motion picture apparatus as described the combination including a film gate plate having an aperture therein, an intermittently actuated feed sprocket, a carriage for supporting the sprocket below said plate, a support for said carriage, means including an adjusting screw for moving said carriage in a plane parallel to said plate, and a guide member extending between the lower end of said plate and said sprocket wheel, said plate and guide member having transversely displaced slots forming on each fingers which telescope with the slots of the other, said plate having additional grooves at the lower end in alignment with the sprocket teeth.

PER JOHAN BERGGREN.